US009534110B2

(12) United States Patent
Amamoto et al.

(10) Patent No.: US 9,534,110 B2
(45) Date of Patent: Jan. 3, 2017

(54) RUBBER COMPOSITION, VULCANIZED RUBBER AND TIRE MANUFACTURED USING THE SAME

(75) Inventors: Tetsuo Amamoto, Kodaira (JP); Yuwa Takahashi, Higashiyamato (JP)

(73) Assignee: BRIDGESTONE CORPORATION, Tokyo (JP)

(*) Notice: Subject to any disclaimer, the term of this patent is extended or adjusted under 35 U.S.C. 154(b) by 195 days.

(21) Appl. No.: 14/111,435

(22) PCT Filed: Apr. 12, 2012

(86) PCT No.: PCT/JP2012/002556
§ 371 (c)(1),
(2), (4) Date: Oct. 11, 2013

(87) PCT Pub. No.: WO2012/140900
PCT Pub. Date: Oct. 18, 2012

(65) Prior Publication Data
US 2014/0039080 A1    Feb. 6, 2014

(30) Foreign Application Priority Data

Apr. 13, 2011  (JP) ................ 2011-089512
Apr. 13, 2011  (JP) ................ 2011-089515

(51) Int. Cl.
| C08J 9/00 | (2006.01) |
| C08L 7/00 | (2006.01) |
| B60C 1/00 | (2006.01) |
| B60C 11/14 | (2006.01) |
| C08K 7/02 | (2006.01) |
| C08L 21/00 | (2006.01) |
| C08J 9/08 | (2006.01) |
| C08J 9/10 | (2006.01) |
| C08K 9/08 | (2006.01) |

(52) U.S. Cl.
CPC ............... *C08L 7/00* (2013.01); *B60C 1/0016* (2013.04); *B60C 11/14* (2013.01); *C08J 9/009* (2013.01); *C08J 9/08* (2013.01); *C08J 9/10* (2013.01); *C08K 7/02* (2013.01); *C08K 9/08* (2013.01); *C08L 21/00* (2013.01); *C08J 2203/02* (2013.01); *C08J 2203/04* (2013.01); *C08J 2321/00* (2013.01)

(58) Field of Classification Search
CPC ......... B60C 1/0016; B60C 11/14; C08J 9/009; C08J 9/08; C08J 9/10; C08J 2203/02; C08J 2203/04; C08J 2321/00; C08K 7/02; C08K 9/08; C08L 21/00; C08L 7/00
See application file for complete search history.

(56) References Cited

U.S. PATENT DOCUMENTS 2,746,898 A    5/1956    Buckwalter et al.

FOREIGN PATENT DOCUMENTS

| EP | 0885925 A1 | 12/1998 |
| EP | 1026010 A2 | 8/2000 |
| EP | 2048191 A1 | 4/2009 |
| JP | 58198546 A | 11/1983 |
| JP | 4-38207 A | 2/1992 |
| JP | 4-110212 A | 4/1992 |
| JP | 11-60770 A | 3/1999 |
| JP | 2000191832 A | 7/2000 |
| JP | 2001-233993 A | 8/2001 |
| JP | 2003193332 A * | 7/2003 |
| JP | 200475718 A | 3/2004 |
| JP | 2009-91388 A | 4/2009 |
| JP | 2009-144032 A | 7/2009 |
| JP | 2009144032 A * | 7/2009 |
| JP | 2010-254860 A | 11/2010 |
| JP | 2010-254866 A | 11/2010 |
| JP | 2011-12111 A | 1/2011 |
| JP | 2012219246 A | 11/2012 |
| KR | 1020060126185 A | 12/2006 |
| KR | 1020060134483 A | 12/2006 |
| KR | 1020070095546 A | 10/2007 |

OTHER PUBLICATIONS

Communication from the Japanese Patent Office dated Oct. 7, 2014 in Japanese Application No. 2011-089515.
Communication from the Patent Office of the Russian Federation dated Dec. 24, 2014 in Russian Application No. 2013150494.
Notification of Reasons for Refusal issued Feb. 3, 2015 in corresponding Japanese Patent Application No. 2011-089515 with translation.
Office Action issued Apr. 3, 2015 by the Russian Federation in corresponding Russian Application No. 2013150494 with translation.
Second Office Action issued May 14, 2015 in corresponding Chinese Patent Application No. 201280018259.8 with translation.
Chinese Office Action issued Jul. 21, 2014 in a corresponding Chinese Patent Application No. 201280018259.8.
Communication dated Dec. 1, 2015, issued by the Japan Patent Office in corresponding Japanese Application No. 2015-028719.
Communication dated Nov. 27, 2015 from Intellectual Property Office of the P.R. China issued in corresponding Application No. 201280018259.8.
Communication dated Jun. 30, 2015, issued by the Japan Patent Office in corresponding Japanese Application No. 2011-089515.
WPI/Thomson, XP-002755852, 2007, 1 pg.
WPI/Thomson, XP 002755851, 2008, 1 pg.
WPI/Thomson, XP-002755853, 2007, 1 pg.
WPI/Thomson, XP-002755857, 1984, 1 pg.

* cited by examiner

*Primary Examiner* — Irina S Zemel
(74) *Attorney, Agent, or Firm* — Sughrue Mion, PLLC

(57) ABSTRACT

The present invention provides a rubber composition that may improve fracture resistance of the resulting tire while maintaining good drainage performance, and a tire using the same. The rubber composition includes: a rubber component; and a fiber made of a hydrophilic resin. The fiber is formed with a coating layer on its surface. The coating layer is made of a resin having affinity for the rubber component.

9 Claims, 3 Drawing Sheets

(a)

(b)

(a)

10

(b)

10

(a)

100

(b)

100

RUBBER COMPOSITION, VULCANIZED RUBBER AND TIRE MANUFACTURED USING THE SAME

CROSS REFERENCE TO RELATED APPLICATIONS

This is a National Stage of International Application No. PCT/JP2012/002556 filed Apr. 12, 2012, claiming priority based on Japanese Patent Application Nos. 2011-089515 filed Apr. 13, 2011 and 2011-089512 filed Apr. 13, 2011 the contents of all of which are incorporated herein by reference in their entirety.

TECHNICAL FIELD

The present invention relates to a rubber composition that can provide excellent fracture resistance while maintaining good drainage performance, and a tire using the same, and in particular, to a tire excellent in on-ice performance.

The present invention also relates to a rubber composition and a vulcanized rubber that can provide good drainage performance as well as a tire using the same, and in particular, to a tire with well balanced on-ice performance and wear resistance.

BACKGROUND ART

Conventionally, from the viewpoint of improving the safety of vehicles, studies have been conducted to improve performance of tires, such as braking performance and driving performance, not only on dry road surfaces but also on other different road surfaces, such as wet road surfaces and icy and snowy road surfaces.

For example, in order to improve performance of a tire on an icy and snowy road, JP 11-060770 A and JP 2001-233993 A (PTL 1-2) each disclose a tire that uses a rubber composition containing a fiber including a resin for the tread, where elongated air bubbles coated by this resin are formed after vulcanization so that they can function as drainage channels as the tread wears to thereby provide improved drainage performance. Attempts have also been made to provide even better drainage performance by using a hydrophilic material as this resin and making use of the affinity for water.

CITATION LIST

Patent Literature

PTL 1: JP 11-060770 A
PTL 2: JP 2001-233993 A

SUMMARY OF INVENTION

Technical Problem

In the case of using a hydrophilic resin, however, it is difficult to allow the resin to be uniformly dispersed in a hydrophobic rubber, and thus the resulting tire may have lower fracture resistance and lower wear resistance, even though its drainage performance is improved by hydrophilic groups exposed to the surface thereof.

Moreover, many of the hydrophilic resins have a melting point near or above the vulcanizing temperature and are thus difficult to foam in molten state with a foaming agent. Therefore, a further improvement is still required before drainage performance can be improved by forming elongated air bubbles. Additionally, due to its low affinity for rubber, the resulting rubber may have lower strength and degraded wear resistance.

In view of the above, an object of the present invention is to provide a rubber composition that may improve fracture resistance of the resulting tire while maintaining good drainage performance thereof, and a tire using the same.

Further, another object of the present invention is to provide a rubber composition and a vulcanized rubber involving a cavity that may readily foam in molten state upon vulcanization and function as a drainage channel, as well as a tire using the same.

Solution to Problem

In order to solve the above-described problems, the inventors of the present invention have found a rubber composition containing a complex (fiber) that is made of a hydrophilic resin and formed with a particular coating layer. The present invention has been completed based on this finding.

That is, a rubber composition of the present invention comprises: a rubber component; and a fiber made of a hydrophilic resin, wherein the fiber is formed with a coating layer on its surface, the coating layer being made of a resin having affinity for the rubber component.

In addition, a rubber composition of the present invention comprises: a rubber component; and a hydrophilic resin, wherein the rubber composition includes a complex, the complex being formed by coating at least a portion of the hydrophilic resin with a resin having affinity for the rubber component so that a cavity is formed in the complex.

It is desirable that the rubber composition further comprises a foaming agent, wherein the rubber composition containing the foaming agent is foamed by kneading and vulcanizing, and the resin having affinity for the rubber component is a low melting point resin having a melting point lower than a highest vulcanizing temperature.

In the rubber composition, it is also desirable that the entire circumference of the hydrophilic resin is coated with the resin having affinity for the rubber component.

The complex is desirably made of a fiber having a core-sheath structure, the core-sheath structure including a core portion made of the hydrophilic resin and a sheath portion made of the resin having affinity for the rubber component.

It is desirable that the hydrophilic resin contains an oxygen, nitrogen or sulfur atom and that it contains at least one substituent selected from the group consisting of —OH, —COOH, —OCOR (R is an alkyl group), —NH$_2$, —NCO, and —SH.

Further, the hydrophilic resin may be an ethylene-vinyl alcohol copolymer, a vinyl alcohol homopolymer, a poly(meth)acrylate resin, a polyamide resin, an aliphatic polyamide-based resin, an aromatic polyamide-based resin, a polyester resin, a polyolefin resin, a polyvinyl alcohol-based resin, a cellulose-based resin, or an acrylic resin.

The content of the complex (fiber) made of the hydrophilic resin is desirably 0.1 parts by mass to 100 parts by mass per 100 parts by mass of the rubber component.

It is desirable that the resin having affinity for the rubber component contains polar components by 50 mass % or less based on the amount of all components thereof, and that this resin is a polyolefin-based resin.

It is desirable that the low melting point resin contains polar components by 50 mass % or less based on the amount of all components thereof, and that this low melting point resin is a polyolefin-based resin.

In addition, the polyolefin-based resin may be a polyethylene-based resin, a polypropylene-based resin, a polyolefin ionomer or a maleic anhydride-modified α-polyolefin.

It is desirable that the rubber composition further comprises a foaming agent, and that a vulcanized rubber obtained by vulcanizing the resulting rubber composition has voids created by foaming with a foaming rate of 1% to 50%. In the vulcanized rubber of the present invention, it is desirable that the coating layer made of the hydrophilic resin resides entirely or partially on an inner surface of the cavity.

A tire according to the present invention is manufactured by using the above-described rubber composition or vulcanized rubber and may be used for tread members.

Advantageous Effect of Invention

The rubber composition of the present invention allows enhancing adhesiveness between the rubber and the fiber (a complex of the hydrophilic resin and the coating layer) while improving dispersibility of the fiber (complex) in the rubber component by virtue of the effects of the hydrophilic resin (the fiber made of the hydrophilic resin) and of the coating layer which is made of the resin having affinity for the rubber component and formed on the surface of the hydrophilic resin (fiber), and imparting excellent fracture resistance to the resulting tire while maintaining good drainage performance (it is ensured that a cavity can be formed in the complex during vulcanization, resulting in excellent drainage performance while maintaining good durability). Accordingly, such a tire has improved braking performance on a wet road and an icy and snowy road, and in particular is extremely useful as a tire having excellent on-ice performance.

DESCRIPTION OF EMBODIMENTS

Figure 1:
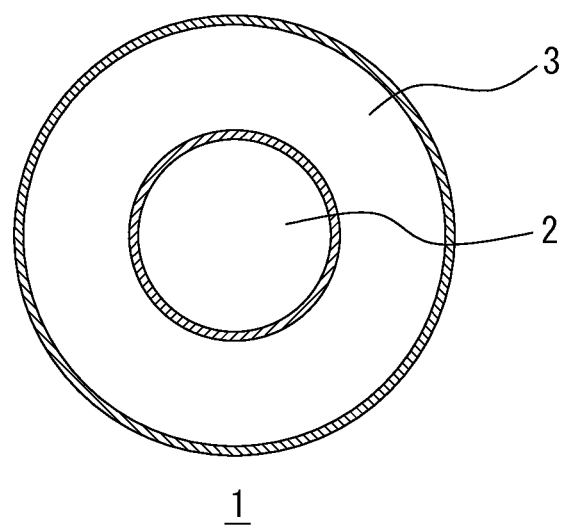
FIG. 1 is a longitudinal sectional view of a die mounted on a twin screw extruder.
Figure 1:
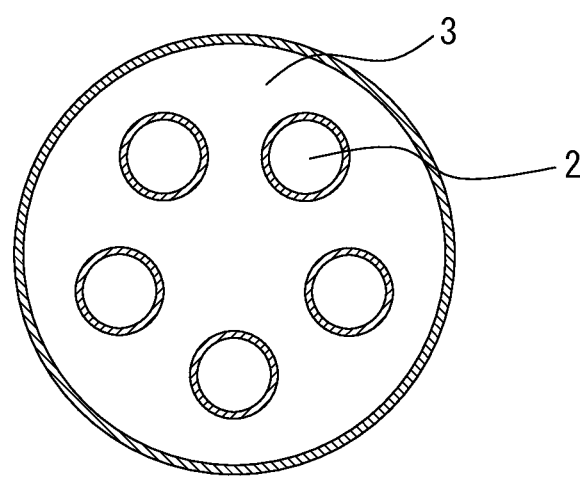

The present invention will now be specifically described below with reference to the accompanying drawings as appropriate.

A rubber composition of the present invention comprises: a rubber component; and a fiber made of a hydrophilic resin, wherein the fiber is formed with a coating layer on its surface, the coating layer being made of a resin having affinity for the rubber component.

In addition, a rubber composition of the present invention comprises: a rubber component; and a hydrophilic resin, wherein the rubber composition includes a complex, the complex being formed by coating at least a portion of the hydrophilic resin with a resin having affinity for the rubber component so that a cavity is formed in the complex.

Rubber components used in the rubber composition of the present invention are not particularly limited, and may include natural rubber (NR), as well as synthetic rubbers such as polyisoprene rubber (IR), styrene-butadiene copolymer rubber (SBR), polybutadiene rubber (BR), ethylene-propylene-diene rubber (EPDM), chloroprene rubber (CR), halogenated butyl rubber, and acrylonitrile-butadiene rubber (NBR); among these preferred are natural rubber (NR), styrene-butadiene copolymer rubber (SBR), and polybutadiene rubber (BR). These rubber components may be used alone or in combination of two or more.

In addition to the above-described rubber components, the rubber composition of the present invention contains a fiber (complex) that is made of a hydrophilic resin and formed with a coating layer on its surface. The use of a hydrophilic resin in the fiber (complex) may lead to sufficient affinity for water, making a large contribution to imparting excellent drainage performance to the resulting tire. That is, when the hydrophilic fiber is exposed to a rubber surface, the rubber surface becomes at least partially hydrophilic, which may lead to improved drainage performance. Although such affinity could potentially interfere with the provision of good dispersibility of the fiber (complex) in the rubber component, the dispersibility of the fiber (complex) in the rubber component may be improved in an extremely effective manner by forming a coating layer on the surface of the fiber (complex) as described later, thereby imparting good drainage performance (and/or durability) to the resulting tire. This may also impart excellent fracture resistance to the tire. In addition, the hydrophilic resin used in the present invention is preferably insoluble in water. Should a water-soluble hydrophilic resin be used, the resin will dissolve into water on a road when the resin is exposed to the rubber surface and thus the rubber surface may lose its hydrophilicity, resulting in reduced drainage performance, in which case a sufficient effect of the present invention cannot be obtained as desired.

Any resin may be used as the hydrophilic resin without limitation that may have affinity for water, i.e., involving a hydrophilic group in the molecule, and is preferably a resin containing an oxygen, nitrogen or sulfur atom, and specific examples thereof include a resin containing at least one substituent selected from —OH, —COOH, —OCOR(R is an alkyl group), —NH$_2$, —NCO, or —SH. Among these, preferred substituents are —OH, —COOH, —OCOR, —NH$_2$, and —NCO.

More specific examples of the above-described hydrophilic resins include an ethylene-vinyl alcohol copolymer, a vinyl alcohol homopolymer, a poly(meth)acrylate resin or resins of esters thereof, a polyamide resin, a polyethylene glycol resin, a carboxyvinyl copolymer, a styrene-maleic acid copolymer, a polyvinylpyrrolidone resin, a vinylpyrrolidone-vinyl acetate copolymer, mercaptoethanol, a polyester resin, a polyolefin resin, a polyvinyl alcohol-based resin, a cellulose-based resin, and an acrylic resin. Among these, the ethylene-vinyl alcohol copolymer, vinyl alcohol homopolymer, poly(meth)acrylate resin, polyamide resin, aliphatic polyamide-based resin, aromatic polyamide-based resin, polyester resin, polyolefin resin, polyvinyl alcohol-based resin, cellulose-based resin and acrylic resin are preferred, and the ethylene-vinyl alcohol copolymer is more preferred.

The complex (fiber) made of the above-described hydrophilic resin is formed with a coating layer on its surface. The coating layer is made of a resin having affinity for the rubber component, preferably a low melting point resin having a melting point lower than a maximum vulcanizing temperature (which will be also referred to as "low melting point resin"). The coating layer thus formed allows the hydrophilic resin itself to effectively retain affinity for water, while having good affinity for the rubber component near the complex (fiber). Further, a foaming agent contained in the rubber composition may be a complement to the hydrophilic resin which would otherwise be difficult to melt during vulcanization, facilitating the formation of a cavity in the complex (fiber). That is, good dispersibility of the complex (fiber) in the rubber component may be ensured and a sufficient drainage effect may be caused by the hydrophilic resin. In addition, if a cavity resides in the complex (fiber), the cavity may fully function as a drainage channel. Further, during vulcanization, when such a resin (low melting point resin) that has a melting point Tm lower than the vulcanizing temperature is used as the resin having affinity for the rubber component, such a low melting point resin may melt during vulcanization and turn into a coating layer with fluidity, which contributes to enabling the complex (fiber) to adhere to the rubber. This configuration may easily bring about a tire with good drainage performance and better fracture resistance (good drainage performance and good durability). It should be noted that such a coating layer normally has a thickness of 0.001 µm to 10 µm, desirably 0.001 µm to 5 µm, although it may vary depending on the content of the hydrophilic resin, the average diameter of the complex (fiber), and so on. By forming a coating layer with a thickness falling within the above-described range, a sufficient effect of the present invention may be obtained as desired. In addition, the above-described coating layer may be formed entirely or partially on the surface of the complex (fiber); specifically, it suffices to form the coating layer with a proportion of at least 50% of the entire surface area of the fiber.

Any resin may be used as the resin having affinity for the rubber component that has, for example, a dissolution parameter (SP value) close to that of the rubber component.

As used herein, the low melting point resin refers to a resin that has a melting point lower than a maximum vulcanizing temperature, where the maximum vulcanizing temperature indicates the highest temperature that is reached by the rubber composition during vulcanization of the rubber composition. For example, when the above-described rubber composition is vulcanized in a mold, the maximum vulcanizing temperature refers to the highest temperature that is reached by the rubber composition during the time from when the rubber composition enters the mold to when it exits the mold for cooling, and this maximum vulcanizing temperature may be measured by, for example, a thermocouple inserted into the rubber composition. No particular limitation is place on the upper limit of the melting point of the above-described low melting point resin. It is preferred, however, that the upper limit is selected in view of the aforementioned points and is generally lower than the maximum vulcanizing temperature of the rubber composition by 10° C. or more, more preferably by 20° C. or more. For the rubber composition, an industrially applicable vulcanizing temperature is generally up to about 190° C. For example, if the maximum vulcanizing temperature is set at this temperature of 190° C., the melting point of the above-described low melting point resin is selected within a range of normally 190° C. or lower, preferably 180° C. or lower, and more preferably 170° C. or lower.

It should be noted that the melting point of the aforementioned resin may be measured by, e.g., a known melting point device, and, for example, a melting point peak temperature measured by a DSC measurement device may be used as the melting point.

Specifically, the above-described low melting point resin is preferably a resin that contains polar components by 50 mass % or less based on the amount of all components thereof, and more preferably a polyolefin-based resin. Such a resin containing polar components in an amount falling within the above-described range based on the amount of all components of the low melting resin has an SP value that is moderately different from that of the rubber component, as well as a melting point moderately lower than the maximum vulcanizing temperature. This resin may ensure good affinity for the rubber component in a sufficient manner, and, when blended with a foaming agent, it may readily melt during vulcanization to facilitate foaming of the vulcanized rubber. Accordingly, it is possible to improve the dispersibility of the complex (fiber) made of a hydrophilic resin in the rubber component more reliably, while ensuring the formation of a cavity in the complex (fiber).

The above-described polyolefin-based resin may be either branched or linear in structure. The polyolefin-based resin may also be an ionomer resin obtained by crosslinking of molecules of an ethylene-methacrylate copolymer with metal ions. Specific examples thereof include polyethylene, polypropylene, polybutene, polystyrene, ethylene-propylene copolymer, ethylene-methacrylate copolymer, ethylene-ethylacrylate copolymer, ethylene-propylene-diene terpolymer, ethylene-vinyl acetate copolymer, and their ionomer resins. These resins may be used alone or in combination of two or more. Among these, preferred are a polyethylene-based resin, a polypropylene-based resin, a polyolefin ionomer, and a maleic anhydride-modified α-polyolefin. When a polyolefin ionomer or a maleic anhydride-modified α-polyolefin is used, it will also be bonded to a hydroxyl group of the hydrophilic resin, allowing a further improvement in rubber strength.

To produce a fiber that is made of a hydrophilic resin and formed with a coating layer made of the resin having affinity for the rubber component, two twin screw extruders equipped with dies 1 as illustrated in FIGS. 1(*a*) and 1(*b*), respectively, are used. A hydrophilic resin is extruded from a die outlet 2 and at the same time a resin having affinity for the rubber component is extruded from a die outlet 3. The extruded resins are formed into an un-drawn yarn, which in turn is subjected to hot drawing to be finished to a fiber shape. The resin having affinity for the rubber component is desirably charged into a hopper by 0.1 parts by mass to 80 parts by mass, preferably 0.1 parts by mass to 20 parts by mass, per 100 parts by mass of the hydrophilic resin, although the amount may vary depending on the length and diameter of the resulting fiber. These resins may be charged in amounts within the above-described range so that a coating layer capable of achieving the desired effect can be effectively formed on the surface of the fiber that is made of the hydrophilic resin and has been obtained through the drawing process.

To produce the complex (fiber) that is made of a hydrophilic resin and formed with the coating layer made of the above-described low melting point resin, such a method may be adopted that involves blending these resins using a mixing mill, melt spinning the mixture to form an un-drawn yarn, and hot drawing the un-drawn yarn to be finished to a fiber shape. Another method is also possible that involves blending the above-described resins using two twin screw extruders equipped with the dies 1 as illustrated in FIGS. 1(*a*) and 1(*b*), and then performing the subsequent steps to obtain a material of fiber shape in a similar manner to the above method. In this case a hydrophilic resin is extruded from the die outlet 2 and at the same time a low melting point resin is extruded from the die outlet 3, and an un-drawn yarn is formed from the extruded resins. These resins are desirably charged into a mixing mill or a hopper so that the aforementioned low melting point resin is charged by 5 parts by mass to 300 parts by mass, preferably 10 parts by mass to 150 parts by mass, per 100 parts by mass of the hydrophilic resin, although the amount may vary depending on the length and diameter of the resulting complex (fiber). These resins may be charged in amounts within the above-described range so that a coating layer capable of achieving the desired effect can be effectively formed on the surface of the complex (fiber) made of the hydrophilic resin that has been obtained through the drawing process.

It is desirable that the resulting fiber has an average length of normally 0.1 mm to 500 mm and preferably 0.1 mm to 7 mm, and an average diameter of normally 0.001 mm to 2 mm and preferably 0.005 mm to 0.5 mm. With an average length and an average diameter within the above-described ranges, complexes (fibers) may not experience undue tangling and good dispersibility may not be interfered with. It is also desirable that the aspect ratio is normally 10 to 4000 and preferably 50 to 2000. As used herein, the aspect ratio refers to a ratio of the major axis to the minor axis of the complex (fiber).

In addition, the content of the complex (fiber) that is made of the hydrophilic resin and formed with the coating layer is normally 0.1 parts by mass to 100 parts by mass, and preferably 0.1 parts by mass to 50 parts by mass, per 100 parts by mass of the rubber component. If the content of the complex (fiber) that is made of the hydrophilic resin and formed with the coating layer falls within the above-described range, it is possible to yield sufficient fracture resistance, while maintaining good drainage performance and offering good drainage performance by means of a cavity formed in the complex (fiber).

It is desirable that the rubber composition of the present invention further contains a foaming agent. The foaming agent contained in the rubber composition allows the gas produced from the foaming agent during the vulcanization process to enter the hydrophilic resin through the coating layer made of the molten, low melting point resin, where air bubbles of a shape to conform to that of the complex (fiber), i.e., elongated shape may be readily formed. Such air bubbles residing in the rubber with a shape to conform to the shape of the complex (fiber) may function as drainage channels as the tire wears down, imparting better drainage performance to the tire.

Specific examples of the above-described foaming agent include: azodicarbonamide (ADCA), dinitro sopentamethylenetetramine (DPT), dinitrosopentastyrenetetramine, benzenesulfonylhydrazide derivative and p,p'-oxybisbenzenesulfonylhydrazide (OBSH); ammonium bicarbonate, sodium bicarbonate and ammonium carbonate which produce carbon dioxide; and a nitro so sulfonylazo compound, N,N'-dimethyl-N,N'-dinitro sophthalamide, toluenesulfonylhydrazide, p-toluenesulfonylsemicarbazide and p,p'-oxybisbenzenesulfonylsemicarbazide which produce nitrogen. Among these, azodicarbonamide (ADCA) and dinitrosopentamethylenetetramine (DPT) are preferred in terms of manufacturing workability, and more preferred is azodicarbonamide (ADCA). These foaming agents may be used alone or in combination of two or more. In addition, the content of the foaming agent is not particularly limited and is preferably in the range of 0.1 parts by mass to 20 parts by mass per 100 parts by mass of the rubber component. It should be noted that the above-described foaming agent may be contained in the above-described complex (fiber).

In addition, as the above-described foaming agent, it is desirable to use a combination of, for example, urea, zinc stearate, zinc benzenesulfinate and zinc oxide as a foaming aid. These examples may be used alone or in combination of two or more. The combination of the foaming agent with a foaming aid may facilitate a foaming reaction to enhance the completeness of the reaction and prevent undue deterioration over time.

It should be noted that a vulcanized rubber obtained by vulcanizing the rubber composition containing the above-described foaming agent has a foaming rate of normally 1% to 50% and preferably 5% to 40%. In the case of the rubber composition containing a foaming agent, if the foaming rate becomes too large, excessively large voids are produced on the rubber surface, in which case a sufficiently large contact area cannot be obtained, whereas if the foaming rate falls within the above-described range, it is possible to ensure formation of air bubbles so as to effectively function as drainage channels, while maintaining the amount of air bubbles at a moderate level, in which case the durability cannot be impaired. As used herein, the foaming rate of the vulcanized rubber refers to an average foaming rate Vs, which is specifically calculated by the following equation (I):

$$Vs=(\rho_0/\rho_1-1)\times 100(\%) \tag{I}$$

Where $\rho_1$ represents the density (g/cm$^3$) of the vulcanized rubber (foamed rubber) and $\rho_0$ represents the density (g/cm$^3$) of a solid phase part of the vulcanized rubber (foamed rubber).

Figure 2:
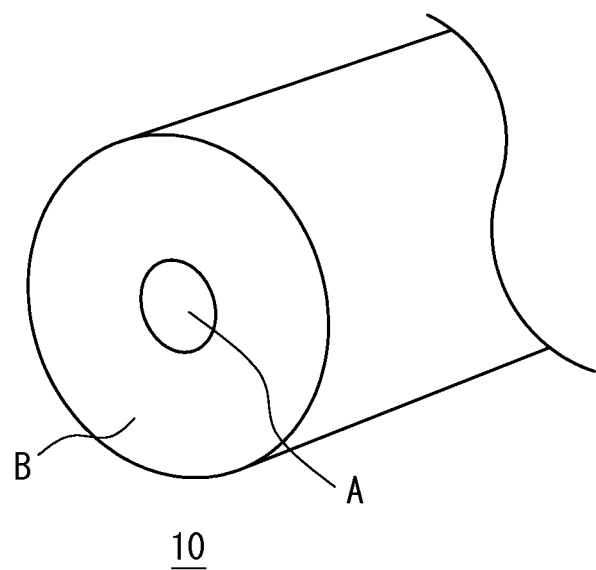
FIG. 2 is a longitudinal sectional perspective view of a fiber that is made of a hydrophilic resin and formed with a coating layer made of a resin having affinity for the rubber component.
Figure 2:
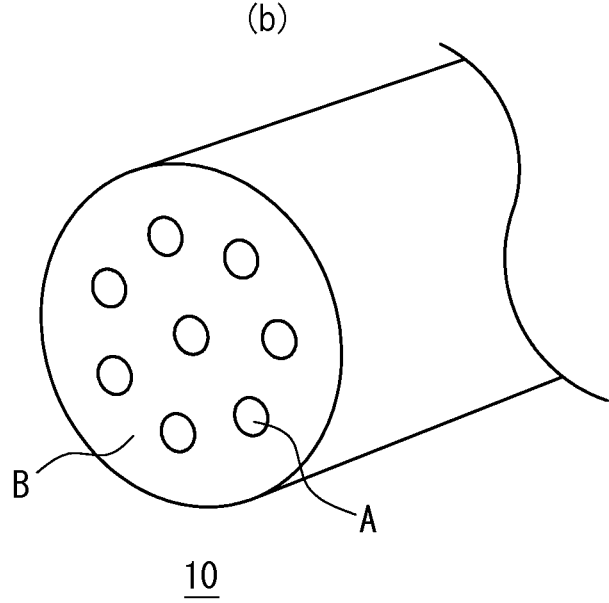

Examples of the fiber 10 that is made of the hydrophilic resin and formed with the above-described coating layer are illustrated in the longitudinal sectional perspective views of FIGS. 2(*a*) and 2(*b*). As illustrated in FIG. 2(*a*), a hydrophilic resin A that is positioned at substantially the center of a fiber 10 may be coated with a resin B having affinity for the rubber component in such a way that the outer circumference of the resin A is surrounded by the resin B, or alternatively, as illustrated in FIG. 2(*b*), the hydrophilic resin A may be scattered in different portions of the resin B so that the surfaces thereof are coated with the resin B.

Figure 3:
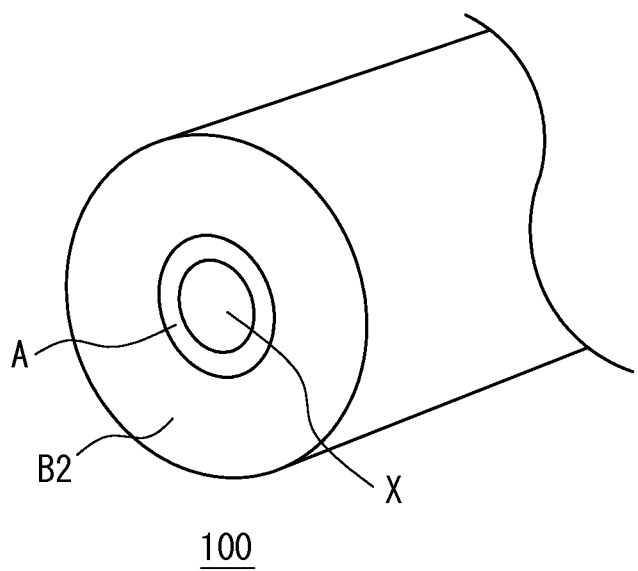
FIG. 3 is a longitudinal sectional view of a complex that is made of a hydrophilic resin and formed with a coating layer made of a resin having affinity for a rubber component.
Figure 3:
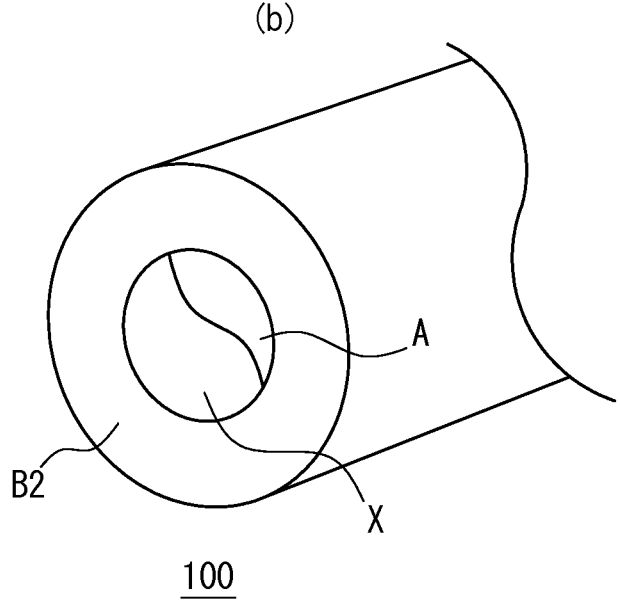

Examples of a cavity (void)-containing fiber 100 that is made of a hydrophilic resin and formed with the above-described coating layer obtained through the vulcanization process are illustrated in the longitudinal sectional perspective views of FIGS. 3(*a*) and 3(*b*). As illustrated in FIG. 3(*a*), a hydrophilic resin A that is positioned substantially near the center of the cavity-containing fiber 100 may be coated with the low melting point resin B2 having affinity for the rubber component and a melting point lower than a maximum vulcanizing temperature in such a way that the outer circumference of the resin A is surrounded by the resin B2 with a cavity X of an elongated shape formed in the inner central portion of the cavity-containing fiber 100, or alternatively, as illustrated in FIG. 3(*b*), the inner circumference of the low melting point resin B2 may be partially coated with the hydrophilic resin A. These cavities X effectively function as drainage channels. Such cavities X may be created by the gas produced during vulcanization of the rubber composition being blended with a foaming agent. It is desirable that the above-described cavities X have an average diameter of normally 0.01 mm to 1 mm and preferably 0.05 mm to 0.7 mm, although the average diameter may vary depending on the average diameter of the complexes (fibers). If the average diameter of the cavities falls within the above-described range, it is possible to have these cavities function as drainage channels sufficiently, while effectively preventing deterioration of durability that would otherwise be caused by the fact that the cavities X account for a too large proportion of the cavity-containing fiber 100.

In the rubber composition of the present invention, the above-described rubber component may contain the complex (fiber) made of a hydrophilic resin, and optionally the above-described foaming agent and a foaming aid, as well as other compounding agents that are commonly used in the rubber industry, including, e.g., a filler such as carbon black, a softening agent, stearic acid, an age resister, zinc oxide, a vulcanization accelerator, and a vulcanizing agent, without departing from the object of the present invention.

A tire according to the present invention is manufactured by using the above-described rubber composition. The above-described tire may be obtained by being vulcanized using an unvulcanized rubber composition after molding, or by carrying out a prevulcanization process and the like to obtain a semi-vulcanized rubber from an unvulcanized rubber composition and then subjecting this semi-vulcanized rubber to a final vulcanization process after molding, depending on the types and members of the tire to be applied. Among other members of the tire, the rubber composition of the present invention is preferably applied to tread members from the viewpoint of making full use of good drainage performance and excellent fracture resistance. It should be noted that normal air or air with adjusted partial pressure of oxygen, as well as an inert gas such as nitrogen, argon and helium may be used as gas to be filled into the tire.

EXAMPLES

The present invention will be described in more detail below with reference to examples thereof. However, the present invention is no way limited to the disclosed examples.

It should be noted that evaluations of examples and comparative examples were conducted for the following factors.

<Rubber-Fiber Adhesiveness>

One hundred (100) fibers were bundled and twisted together 30 times per 10 cm into a yarn, which was then embedded into a rubber and vulcanized to obtain a sample. Tensile force (kgf/inch) required to draw out the yarn from the sample was measured at RT (room temperature), and the obtained result was considered as rubber-fiber adhesiveness and assessed as being indexed with a score of 100 representing the result of Comparative Example 1. It should be noted that any foaming agent contained in the rubber composition was removed before experiments.

<Dispersibility>

The number of fibers was counted that were shown in a view field under a microscope (VHX-500, available from Keyence Corporation) at ×100 magnification. This counting was repeated for a total of ten different view fields in the same rubber. Then, an average of the number of fibers and a standard deviation of the number of fibers present in each field were calculated to evaluate dispersibility.

<Tensile Strength (Tb)>

Tensile strength (MPa) was measured according to JIS K 6251.

<Elongation at Break (Eb)>

Elongation at break (%) was measured according to JIS K 6251.

<Wear Resistance (Index)>

Using a vehicle with testing tires (tire size: 195/65R15) as described later, the depth of the remaining tread grooves was measured after running 10,000 km on a pavement surface, and the running distance that wore the tread of each formulation by 1 mm was calculated for relative comparison. The obtained results are shown in Table 1 as being indexed with a score of 100 representing the result of the tire of Comparative Example 1. Larger index values represent better wear resistance. The evaluation results are shown in Table 1.

<On-Ice Performance (Index)>

Four testing tires (tire size: 195/65R15) as described later were mounted on a domestic passenger car of 1600 CC displacement to evaluate the on-ice braking performance at an ice temperature of −1° C. Using the tire of Comparative Example 1 as a control, on-ice performance was calculated using the following equation: on-ice performance=(braking distance of control tire/braking distance of other examples)× 100. Larger values represent better on-ice performance. The evaluation results are shown in Table 1.

<Rubber-Resin Adhesiveness>

One hundred (100) complexes (fibers) were bundled and twisted together 30 times per 10 cm into a yarn, which was then embedded into a rubber and vulcanized to obtain a sample. Tensional force (kgf/inch) required to draw out the complexes (fibers) from the sample was measured at RT (room temperature), and the obtained result was considered as rubber-resin adhesiveness and assessed as being indexed with a score of 100 representing the results of Comparative Example 1A. It should be noted that any foaming agent contained in the rubber composition was removed before experiments.

<Resin-Resin Adhesiveness>

Force (kgf/inch) required to tear off each resin coated with the above-described complex (fiber) was measured at RT (room temperature), and the obtained result was considered as resin-resin adhesiveness and shown as being indexed with a score of 100 representing the result of Example 1A. Resins used in the above-described complex (fiber) were molded into sheets of 5 mm to 10 mm thick, attached together and then heated at 200° C. for 5 minutes so as to be bonded together. The product was subjected to peel test according to JIS K 6854-1 (90° peel) and the obtained result is shown as being indexed with a score of 100 representing the result of Example 1A.

<Average Diameter and the Number of Elongated Voids>

Each of the resulting rubber compositions was vulcanized at 170° C. for 15 minutes to observe its cross section, where five random portions of a cavity in the resin were selectively observed and diameters thereof were measured to obtain an average.

<Foaming Rate>

The foaming rate was calculated the aforementioned equation (I).

<Dispersibility>

The number of complexes (fibers) was counted that were shown in a view field under a microscope (VHX-500, available from Keyence Corporation) at ×100 magnification. This counting was repeated for a total of ten different view fields in the same rubber to evaluate the dispersibility based on the standard deviation of the number of the complexes (fibers).

<Tensile Strength>

According to JIS K 6251, tensile strength (MPa) was measured at room temperature using a JIS No. 3 test specimen with a testing speed of 500 mm/min.

<Tensile Strength after Foaming Rate Compensation>

Based on the obtained results of the aforementioned tensile strength, tensile strength with a foaming rate of 0% was calculated by the following equation (II):

tensile strength after foaming rate compensation=tensile strength/{(100−foaming rate)/100}(MPa)

<Tensile Elongation>

According to JIS K 6251, tensile elongation (%) was measured at room temperature using a JIS No. 3 test specimen with a testing speed of 500 mm/min.

<Rubber Hardness>

Rubber hardness (index) was measured with a durometer type A according to JIS K 6253.

<On-Ice Performance (Index with Foaming Rate Compensation)>

Four testing radial tires for passenger cars (tire size: 195/65R15), each manufactured by a conventional method with the obtained rubber composition of each formulation used for the tread (foamed rubber layer), were mounted on a domestic passenger car of 1600 CC displacement to evaluate the on-ice braking performance at an ice temperature of −1° C. Using the tire of Comparative Example 1A as a control, on-ice performance was calculated using the following equation: on-ice performance=(braking distance of control tire/braking distance of other examples)×100. Larger values represent better on-ice performance. The evaluation results are shown in Tables 1A and 2A.

<Wear Resistance (Index with Foaming Rate Compensation)>

Using a vehicle manufactured by a conventional method with each of the obtained rubber compositions used for the tread (formed rubber layer), the depth of the remaining tread grooves was measured after running 10,000 km on a pavement surface, and the running distance that wore the tread by 1 mm was calculated for relative comparison. The obtained results are shown in Table 1A as being indexed with a score of 100 representing the result of the tire of Comparative Example 1A, while in Table 2A as being indexed with a score of 100 representing the result of the tire of Example 1A. Larger index values represent better wear resistance. The evaluation results are shown in Tables 1A and 2A.

Production Example 1

Production of Fiber A Formed with a Coating Layer

Using the aforementioned two twin screw extruders, 100 parts by mass of an ethylene-vinyl alcohol copolymer (EVAL F104B manufactured by Kuraray Co., Ltd.) and 10 parts by mass of polypropylene (Novatec FY4 manufactured by Japan Polypropylene Corporation) were charged into a hopper. Then, the ethylene-vinyl alcohol copolymer was extruded from the die outlet 2 and at the same time polypropylene was extruded from the die outlet 3 to obtain a fiber according to a conventional method. This fiber was subsequently cut to a length of 5 mm to fabricate a fiber A formed with a coating layer made of the polypropylene.

Production Example 2

Production of Fiber B Formed with a Coating Layer

A fiber B was fabricated according to the procedure as described above in relation to Production Example 1, except for the use of polyethylene (Novatec U360 manufactured by Japan Polyethylene Corporation) in place of polypropylene.

Production Example 3

Production of Fiber C Formed with a Coating Layer

A fiber C was fabricated according to the procedure as described above in relation to Production Example 1, except for the use of a polyacrylic resin (Acrypet MD001 manufactured by Mitsubishi Rayon Co., Ltd.) in place of an ethylene-vinyl alcohol copolymer.

Production Example 4

Production of Fiber D Formed with a Coating Layer

A fiber D was fabricated according to the procedure as described above in relation to Production Example 1, except for the use of the aforementioned polyacrylate in place of an ethylene-vinyl alcohol copolymer and the aforementioned polyethylene in place of polypropylene.

Production Example 5

Production of Fiber W

Only the aforementioned polypropylene was charged into the aforementioned hopper and extruded from both of the die outlets 2 and 3 to fabricate a fiber W according to the procedure otherwise the same as described above in relation to Production Example 1.

Production Example 6

Production of Fiber X

Only the aforementioned polyethylene was charged into the aforementioned hopper and extruded from both of the die outlets 2 and 3 to fabricate a fiber X according to the procedure otherwise the same as described above in relation to Production Example 1.

Production Example 7

Production of Fiber Y

Only the aforementioned ethylene-vinyl alcohol copolymer was charged into the aforementioned hopper and extruded from both of the die outlets 2 and 3 to fabricate a fiber Y according to the procedure otherwise the same as described above in relation to Production Example 1.

Production Example 8

Production of Fiber Z

Only the aforementioned polyacrylate was charged into the aforementioned hopper and extruded from both of the die outlets 2 and 3 to fabricate a fiber Z according to the procedure otherwise the same as described above in relation to Production Example 1.

Production Example 1A

Production of Complex (Fiber) A2 Formed with a Coating Layer

Using the aforementioned two twin screw extruders, 40 parts by mass of polyethylene continuing (Novatec HJ360 (with MFR 5.5 and melting point 132° C.) manufactured by Japan Polyethylene Corporation) and 40 parts by mass of an acrylic resin (Acrypet MD001 manufactured by Mitsubishi Rayon Co., Ltd.) were charged into the hopper, where the acrylic resin was extruded from the die outlet 2 and at the same time the polyethylene was extruded from the die outlet 3 to obtain a complex (fiber) according to a conventional method, which in turn was cut to a length of 3 mm to thereby fabricate a complex (fiber) A2 formed with a coating layer made of polyethylene.

Production Example 2A

Production of Complex (Fiber) B2 Formed with a Coating Layer

A complex (fiber) B2 was fabricated according to the procedure as described above in relation to Production Example 1A, except for the use of TAFMER® (P0180 (with MFR 4.5) manufactured by Mitsui Chemicals, Inc.) in place of polyethylene.

Production Example 3A

Production of Complex (Fiber) C2 Formed with a Coating Layer

A complex (fiber) C2 was fabricated according to the procedure as described above in relation to Production Example 1A, except for the use of an ethylene-vinyl alcohol copolymer (EVAL F104B (with MFR 4.4 and melting point 183° C.) manufactured by Kuraray Co., Ltd.) in place of an acrylic resin.

Production Example 4A

Production of Complex (Fiber) D2 Formed with a Coating Layer

A complex (fiber) D2 was fabricated according to the procedure as described above in relation to Production Example 1A, except for the use of the aforementioned TAFMER in place of polyethylene and the ethylene-vinyl alcohol copolymer in place of an acrylic resin.

Production Example 5A

Production of Complex (Fiber) E2 Formed with a Coating Layer

A complex (fiber) E2 was fabricated according to the procedure as described above in relation to Production Example 1A, except for the use of a maleic anhydride-modified TAFMER (MH8510) in place of polyethylene and the aforementioned ethylene-vinyl alcohol copolymer in place of an acrylic resin.

Production Example 6A

Production of Complex (Fiber) F2 Formed with a Coating Layer

A complex (fiber) F2 was fabricated according to the procedure as described above in relation to Production Example 1A, except for the use of an ionomer (Himilan 1557 manufactured by DuPont-Mitsui Polychemicals Co., Ltd) in place of polyethylene and the aforementioned ethylene-vinyl alcohol copolymer in place of an acrylic resin.

Production Example 7A

Production of Complex (Fiber) G2 Formed with a Coating Layer

A complex (fiber) G2 was fabricated according to the procedure as described above in relation to Production Example 1A, except for the use of EVAL G156B having a low melting point (Tm: 160° C.) in place of polyethylene and EVAL F104B in place of an acrylic resin.

Production Example 8A

Production of Fiber Q2

Only the aforementioned polyethylene was charged into the aforementioned twin screw extruders to fabricate a fiber Q2 according to the procedure described above in relation to Production Example 1A.

Production Example 9A

Production of Fiber U2

Only the aforementioned TAFMER was charged into the aforementioned twin screw extruders above to fabricate a fiber U2 according to the procedure described above in relation to Production Example 1A.

Production Example 10A

Production of Fiber Y2

Only the aforementioned maleic anhydride-modified TAFMER was charged into the aforementioned twin screw extruders to fabricate a fiber Y2 according to the procedure otherwise the same as described above in relation to Production Example 1A.

Production Example 11A

Production of Fiber Z2

Only the aforementioned ionomer was charged into the aforementioned twin screw extruders to fabricate a fiber Z2 according to the procedure described above in relation to Production Example 1A.

Production Example 12A

Production of Fiber W2

Only the aforementioned acrylic resin was charged into the aforementioned twin screw extruders to fabricate a fiber W2 according to the procedure described above in relation to Production Example 1A.

Production Example 13A

Production of Fiber X2

Only the aforementioned ethylene-vinyl alcohol copolymer (EVAL F104B manufactured by Kuraray Co., Ltd.) was charged into the aforementioned twin screw extruders to fabricate a fiber X2 according to the procedure otherwise the same as described above in relation to Production Example 1A.

Production Example 14A

Production of Fiber XX2

Only the aforementioned ethylene-vinyl alcohol copolymer (EVAL G156B manufactured by Kuraray Co., Ltd.) was charged into the aforementioned twin screw extruders to fabricate a fiber XX2 according to the procedure otherwise the same as described above in relation to Production Example 1A.

Comparative Examples 1 to 4

The fibers W to Z, each formed without the above-described coating layer, were used to prepare and obtain rubber compositions by compounding the components according to the formulations shown in Table 1.

Using the resulting rubber compositions for treads, testing radial tires for automobiles with a tire size of 195/65R15 were manufactured in accordance with a conventional method.

Examples 1 to 4

The fibers A to D, each formed with the above-described coating layer, were used to prepare and obtain rubber compositions by compounding the components according to the formulations shown in Table 1.

Using the resulting rubber compositions for treads, testing radial tires for automobiles with a tire size of 195/65R15 were manufactured in accordance with a conventional method.

TABLE 1

|  | Comparative Example 1 | Comparative Example 2 | Comparative Example 3 | Comparative Example 4 | Example 1 | Example 2 | Example 3 | Example 4 |
|---|---|---|---|---|---|---|---|---|
| Natural Rubber | 60 | 60 | 60 | 60 | 60 | 60 | 60 | 60 |
| Butadiene Rubber | 40 | 40 | 40 | 40 | 40 | 40 | 40 | 40 |
| Carbon Black | 60 | 60 | 60 | 60 | 60 | 60 | 60 | 60 |
| Stearic Acid | 2 | 2 | 2 | 2 | 2 | 2 | 2 | 2 |
| Zinc Oxide | 6 | 6 | 6 | 6 | 6 | 6 | 6 | 6 |
| Vulcanization Accelerator *1 | 1.2 | 1.2 | 1.2 | 1.2 | 1.2 | 1.2 | 1.2 | 1.2 |
| Insoluble Sulfur | 4 | 4 | 4 | 4 | 4 | 4 | 4 | 4 |
| Fiber A | — | — | — | — | 5 | — | — | — |
| Fiber B | — | — | — | — | — | 5 | — | — |
| Fiber C | — | — | — | — | — | — | 5 | — |
| Fiber D | — | — | — | — | — | — | — | 5 |
| Fiber W | 5 | — | — | — | — | — | — | — |
| Fiber X | — | 5 | — | — | — | — | — | — |
| Fiber Y | — | — | 5 | — | — | — | — | — |
| Fiber Z | — | — | — | 5 | — | — | — | — |
| Evaluation | | | | | | | | |
| Rubber-Fiber Adhesiveness (at RT: Index) | 100 | 120 | 10 | 8 | 102 | 118 | 101 | 117 |
| Dispersibility | 7.6 | 7.5 | 53 | 56 | 7.8 | 7.3 | 7.5 | 14 |
| Tensile Strength (TB): MPa | 20.4 | 23.5 | 15.3 | 12.4 | 20.4 | 23.5 | 21.6 | 7.2 |
| Elongation at Break (Eb): % | 465 | 521 | 352 | 423 | 435 | 578 | 498 | 564 |
| On-ice Performance (Index) | 100 | 102 | 105 | 104 | 121 | 122 | 115 | 116 |
| Wear Resistance (Index) | 100 | 114 | 72 | 58 | 99 | 112 | 102 | 110 |

Note:
The values shown are in units of mass parts except for those in evaluation.
*1: di-2-benzothiazyl-disulfide (NOCCELER DM), manufactured by Ouchi Shinko Chemical Industrial Co., Ltd.

Comparative Examples 1A to 8A

The aforementioned fibers were used to prepare and obtain rubber compositions by compounding the components according to the formulations shown in Tables 1A and 2A.

Examples 1A to 7A

The aforementioned complexes (fibers) were used to prepare and obtain rubber compositions by compounding the components according to the formulations shown in Table 2A.

TABLE 1A

|  | Comparative Example 1A | Comparative Example 2A | Comparative Example 3A | Comparative Example 4A | Comparative Example 5A | Comparative Example 6A | Comparative Example 7A |
|---|---|---|---|---|---|---|---|
| Natural Rubber | 60 | 60 | 60 | 60 | 60 | 60 | 60 |
| Butadiene Rubber | 40 | 40 | 40 | 40 | 40 | 40 | 40 |
| Carbon Black | 40 | 40 | 40 | 40 | 40 | 40 | 40 |
| Stearic Acid | 2 | 2 | 2 | 2 | 2 | 2 | 2 |
| Zinc Oxide | 6 | 6 | 6 | 6 | 6 | 6 | 6 |
| Vulcanization Accelerator *1 | 1.2 | 1.2 | 1.2 | 1.2 | 1.2 | 1.2 | 1.2 |
| Insoluble Sulfur | 3.5 | 3.5 | 3.5 | 3.5 | 3.5 | 3.5 | 3.5 |
| Foaming Agent *2 | 7 | 7 | 7 | 7 | 7 | 7 | 7 |
| Fiber A2 | — | — | — | — | — | — | — |
| Fiber B2 | — | — | — | — | — | — | — |
| Fiber C2 | — | — | — | — | — | — | — |
| Fiber D2 | — | — | — | — | — | — | — |
| Fiber E2 | — | — | — | — | — | — | — |

TABLE 1A-continued

|  | Comparative Example 1A | Comparative Example 2A | Comparative Example 3A | Comparative Example 4A | Comparative Example 5A | Comparative Example 6A | Comparative Example 7A |
|---|---|---|---|---|---|---|---|
| Fiber F2 | — | — | — | — | — | — | — |
| Fiber G2 | — | — | — | — | — | — | — |
| Fiber Q2 | 5 | — | — | — | — | — | — |
| Fiber U2 | — | 5 | — | — | — | — | — |
| Fiber Y2 | — | — | 5 | — | — | — | — |
| Fiber Z2 | — | — | — | 5 | — | — | — |
| Fiber W2 | — | — | — | — | — | 5 | — |
| Fiber X2 | — | — | — | — | — | — | 5 |
| Fiber XX2 | — | — | — | — | — | — | — |
| Evaluation | | | | | | | |
| Rubber-Resin Adhesiveness (Index) | 100 | 96 | 143 | 138 | 11 | 8 | 7 |
| Resin-Resin Adhesiveness (Index) | — | — | — | — | — | — | — |
| Average Diameter of Elongated Voids (μm) | 180 | 186 | 187 | 195 | 52 | 68 | 66 |
| Number of Elongated Voids (Index) | 100 | 101 | 100 | 99 | 105 | 102 | 72 |
| Foaming Rate (%) | 32 | 34 | 35 | 33 | 33 | 27 | 17 |
| Dispersibility | 7.6 | 7.6 | 7.5 | 7.2 | — | 58 | 59 |
| Tensile Strength After Foaming Rate Compensation (MPa) | 21.0 | 23.0 | 24.0 | 21.6 | 8.4 | 9.4 | 8.9 |
| Tensile Elongation (%) | 620 | 659 | 626 | 629 | 739 | 269 | 261 |
| Rubber Hardness (Index) | 101 | 103 | 98 | 97 | 93 | 96 | 99 |
| On-ice Performance (Index with Foaming Rate Compensation) | 100 | 103 | 102 | 107 | 80 | 103 | 105 |
| Wear Resistance (Index with Foaming Rate Compensation) | 100 | 97 | 116 | 103 | 32 | 31 | 25 |

Note:
The values shown are in units of mass parts except for those in evaluation.

TABLE 2A

|  | Comparative Example 8A | Example 1A | Example 2A | Example 3A | Example 4A | Example 5A | Example 6A | Example 7A |
|---|---|---|---|---|---|---|---|---|
| Natural Rubber | 60 | 60 | 60 | 60 | 60 | 60 | 60 | 60 |
| Butadiene Rubber | 40 | 40 | 40 | 40 | 40 | 40 | 40 | 40 |
| Carbon Black | 40 | 40 | 40 | 40 | 40 | 40 | 40 | 40 |
| Stearic Acid | 2 | 2 | 2 | 2 | 2 | 2 | 2 | 2 |
| Zinc Oxide | 6 | 6 | 6 | 6 | 6 | 6 | 6 | 6 |
| Vulcanization Accelerator *1 | 1.2 | 1.2 | 1.2 | 1.2 | 1.2 | 1.2 | 1.2 | 1.2 |
| Insoluble Sulfur | 3.5 | 3.5 | 3.5 | 3.5 | 3.5 | 3.5 | 3.5 | 3.5 |
| Foaming Agent *2 | 7 | 7 | 7 | 7 | 7 | 7 | 7 | 7 |
| Fiber A2 | — | 5 | — | — | — | — | — | — |
| Fiber B2 | — | — | 5 | — | — | — | — | — |
| Fiber C2 | — | — | — | 5 | — | — | — | — |
| Fiber D2 | — | — | — | — | 5 | — | — | — |
| Fiber E2 | — | — | — | — | — | 5 | — | — |
| Fiber F2 | — | — | — | — | — | — | 5 | — |
| Fiber G2 | — | — | — | — | — | — | — | 5 |
| Fiber Q2 | — | — | — | — | — | — | — | — |
| Fiber U2 | — | — | — | — | — | — | — | — |
| Fiber Y2 | — | — | — | — | — | — | — | — |
| Fiber Z2 | — | — | — | — | — | — | — | — |
| Fiber W2 | — | — | — | — | — | — | — | — |
| Fiber X2 | — | — | — | — | — | — | — | — |
| Fiber XX2 | 5 | — | — | — | — | — | — | — |
| Evaluation | | | | | | | | |
| Rubber-Resin Adhesiveness (Index) | 9 | 100 | 96 | 100 | 96 | 143 | 138 | 8 |
| Resin-Resin Adhesiveness (Index) | — | 100 | 96 | 92 | 86 | 286 | 252 | 186 |
| Average Diameter of Elongated Voids (μm) | 188 | 176 | 182 | 178 | 178 | 180 | 178 | 162 |
| Number of Elongated Voids (Index) | 100 | 102 | 98 | 102 | 101 | 100 | 99 | 99 |
| Foaming Rate (%) | 33 | 33 | 32 | 33 | 34 | 35 | 36 | 34 |
| Dispersibility | 54 | 7.5 | 7.6 | 7.4 | 7.4 | 7.3 | 7.5 | 56 |
| Tensile Strength After Foaming Rate Compensation (MPa) | 8.8 | 19.7 | 19.6 | 20.1 | 21.5 | 24.0 | 25.0 | 9.1 |

TABLE 2A-continued

|  | Comparative Example 8A | Example 1A | Example 2A | Example 3A | Example 4A | Example 5A | Example 6A | Example 7A |
|---|---|---|---|---|---|---|---|---|
| Tensile Elongation (%) | 275 | 572 | 575 | 584 | 613 | 681 | 692 | 241 |
| Rubber Hardness (Index) | 98 | 101 | 99 | 98 | 98 | 101 | 103 | 104 |
| On-ice Performance (Index with Foaming Rate Compensation) | 85 | 112 | 110 | 121 | 118 | 116 | 122 | 107 |
| Wear Resistance (Index with Foaming Rate Compensation) | 45 | 100 | 101 | 101 | 102 | 115 | 119 | 37 |

Note:
The values shown are in units of mass parts except for those in evaluation.
*1: di-2-benzothiazyl-disulfide (NOCCELER DM), manufactured by Ouchi Shinko Chemical Industrial Co., Ltd.
*2: Cellmic AN, manufactured by Sankyo Kasei Co., Ltd.

It can be seen from the above that Examples 1 to 4, each involving a fiber formed with a coating layer, offer good dispersibility of the fiber in the rubber component, as well as excellent adhesiveness between the rubber and the fiber, and have positive effects on both tensile strength and elongation at break, as compared to Comparative Examples 1 to 4, each involving a fiber formed without a coating layer.

As compared to Comparative Examples 1 and 2, Comparative Examples 3 and 4 have higher on-ice performance, but lower dispersibility of the fiber in the rubber component and worse physical properties of the rubber, resulting in lower wear resistance.

Examples 1 to 4 may balance the physical properties of the rubber with on-ice performance by coating the fiber.

It can also be seen from the above that Examples 1A to 7A, each containing a complex (fiber) formed with a coating layer and having a cavity formed therein, show better results than Comparative Examples 1A to 8A, each containing a fiber formed without a coating layer; among these, Examples 1A to 4A, each being coated with a low melting point resin and capable of well controlling the size of elongated voids, show higher on-ice performance and have positive effects on both fracture resistance and wear resistance. It will also be appreciated that Examples 5A and 6A have better fracture resistance because they use a resin that can be well adhered not only to rubber but also to a hydrophilic resin as the above-described low melting point resin.

REFERENCE SIGNS LIST

1: Die of twin screw extruder
2: Die outlet for hydrophilic resin
3: Die outlet for a (low melting point) resin having affinity for the rubber component
10: Fiber made of a hydrophilic resin and formed with a coating layer made of a resin having affinity for the rubber component
100: Complex (fiber) made of a hydrophilic resin and formed with a coating layer made of a low melting point resin having affinity for rubber component and having a melting point lower than a maximum vulcanizing temperature
A: Hydrophilic resin
B: Resin having affinity for rubber component
B2: Low melting point resin having affinity for rubber component and having a melting point lower than a maximum vulcanizing temperature
X: Cavity

The invention claimed is:

1. A rubber composition comprising: a rubber component; and a hydrophilic resin, wherein
the rubber composition includes a complex, the complex being formed by coating at least a portion of the hydrophilic resin with a resin having affinity for the rubber component so that a cavity is formed in the complex, and
the complex is made of a fiber having a core-sheath structure, the core-sheath structure including a core portion made of the hydrophilic resin and a sheath portion made of the resin having affinity for the rubber component,
wherein the rubber composition further comprises a foaming agent,
the rubber composition containing the foaming agent is foamed by kneading and vulcanizing,
the resin having affinity for the rubber component is a low melting point resin having a melting point lower than a highest vulcanizing temperature, and
the cavity has an average diameter of 0.01 mm to 1 mm.

2. The rubber composition according to claim 1, wherein the entire circumference of the hydrophilic resin is coated with the resin having affinity for the rubber component.

3. The rubber composition according to claim 1, wherein the content of the complex is 0.1 parts by mass to 100 parts by mass per 100 parts by mass of the rubber component.

4. The rubber composition according to claim 1, wherein the low melting point resin is a polyolefin-based resin.

5. The rubber composition according to claim 1, wherein a forming rate is 32% to 34%.

6. The rubber composition according to claim 1, wherein the hydrophilic resin is an ethylene-vinyl alcohol copolymer and the resin having affinity for the rubber component is a polyethylene.

7. The rubber composition according to claim 1, wherein the hydrophilic resin is an ethylene-vinyl alcohol copolymer and the resin having affinity for the rubber component is an α-polyolefin.

8. The rubber composition according to claim 1, wherein the hydrophilic resin is an ethylene-vinyl alcohol copolymer and the resin having affinity for the rubber component is a maleic anhydride-modified α-polyolefin.

9. The rubber composition according to claim 1, wherein the hydrophilic resin is an ethylene-vinyl alcohol copolymer and the resin having affinity for the rubber component is an ionomer.

* * * * *

UNITED STATES PATENT AND TRADEMARK OFFICE
CERTIFICATE OF CORRECTION

PATENT NO.        : 9,534,110 B2
APPLICATION NO.   : 14/111435
DATED             : January 3, 2017
INVENTOR(S)       : Amamoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 210 days.

Signed and Sealed this
Twenty-fifth Day of September, 2018

Andrei Iancu
*Director of the United States Patent and Trademark Office*